No. 840,431.

PATENTED JAN. 1, 1907.

J. G. CALLAN.
TURBO GENERATOR.
APPLICATION FILED JUNE 8, 1906.

5 SHEETS—SHEET 1.

Witnesses:

Inventor:
John G. Callan,
by Albert G. Davis
Atty.

No. 840,431. PATENTED JAN. 1, 1907.
J. G. CALLAN.
TURBO GENERATOR.
APPLICATION FILED JUNE 8, 1906.
5 SHEETS—SHEET 2.
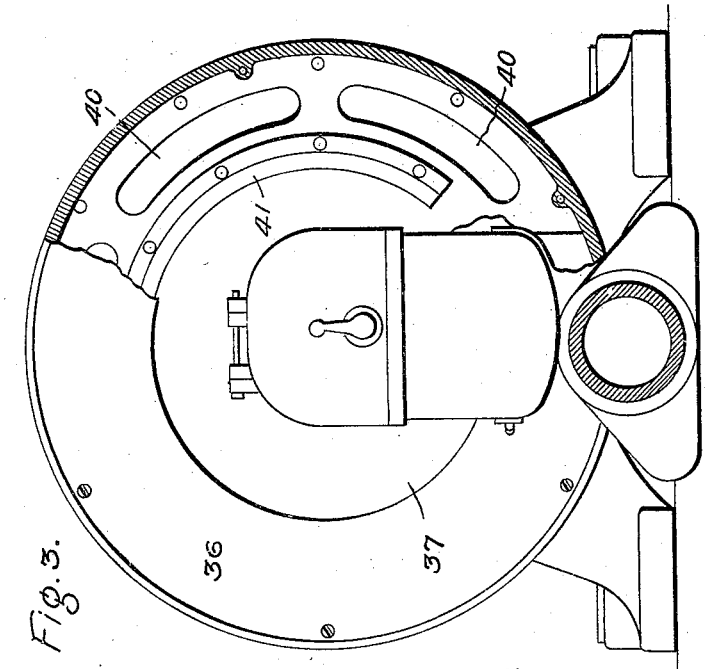
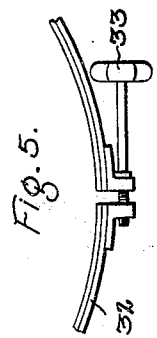
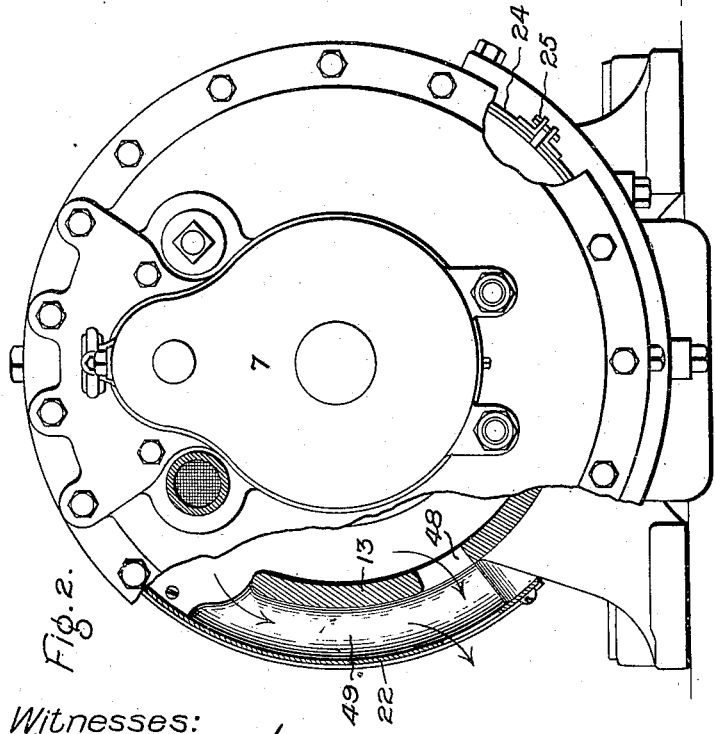
Witnesses:
Helen Orford
Margaret E. Hooley
Inventor:
John G. Callan,
by Albert G. Davis
Atty.

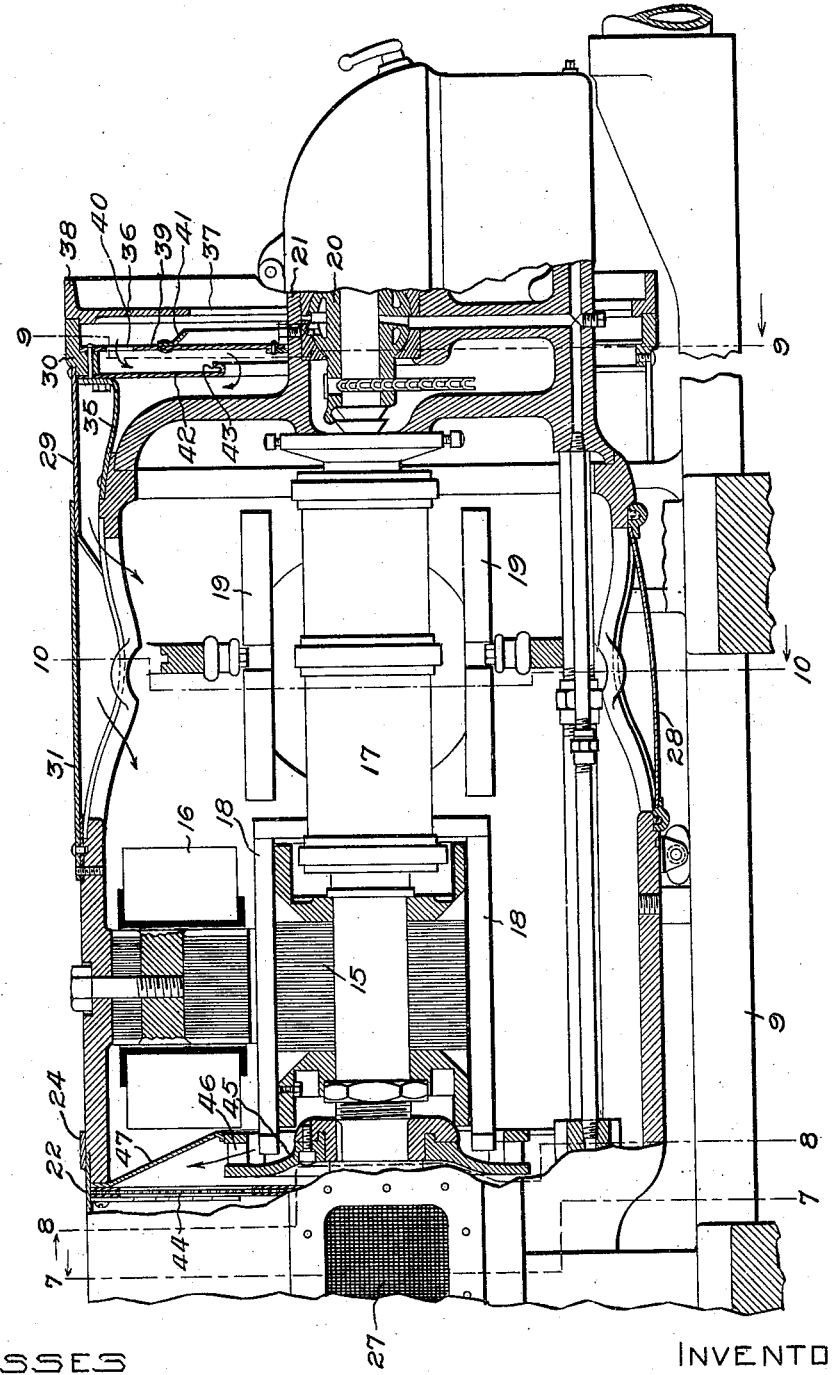

No. 840,431. PATENTED JAN. 1, 1907.
J. G. CALLAN.
TURBO GENERATOR.
APPLICATION FILED JUNE 8, 1906.

5 SHEETS—SHEET 4.

Witnesses.
Helen Alford
Margaret E. Woolley

Inventor
John G. Callan
by Albert G. Davis
Atty.

No. 840,431. PATENTED JAN. 1, 1907.
J. G. CALLAN.
TURBO GENERATOR.
APPLICATION FILED JUNE 8, 1906.

5 SHEETS—SHEET 5.

WITNESSES
Helen Alford
Margaret E. Holley

INVENTOR
JOHN G. CALLAN.
Albert G. Davis
by Atty.

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

TURBO-GENERATOR.

No. 840,431.          Specification of Letters Patent.          Patented Jan. 1, 1907.

Original application filed May 25, 1905, Serial No. 262,287. Divided and this application filed June 8, 1906. Serial No. 320,756.

*To all whom it may concern:*

Be it known that I, JOHN G. CALLAN, a citizen of the United States, residing at Lynn, county of Essex, State of Massachusetts, have invented certain new and useful Improvements in Turbo-Generators, of which the following is a specification.

The present application is a division of my pending application, Serial No. 262,287, filed May 25, 1905, and is made pursuant to requirements of the United States Patent Office under the provisions of Rules 41 and 42.

The invention relates to turbo-generators, and has for its object the provision of a turbo-generator which is reliable and efficient in operation.

The improvements are directed more particularly to the construction and arrangement of the casing and to the means for ventilating the generator and reducing the temperature of the turbo-generator as a whole.

Figure 1:
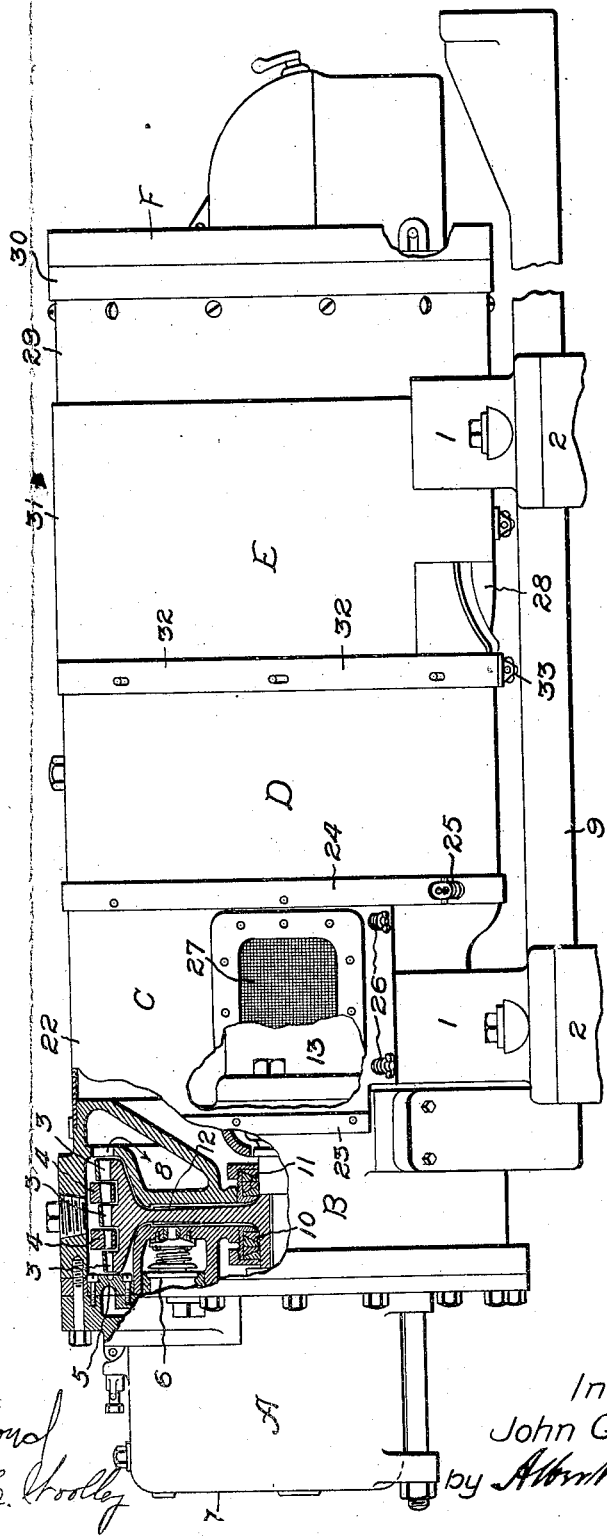
Figure 7:
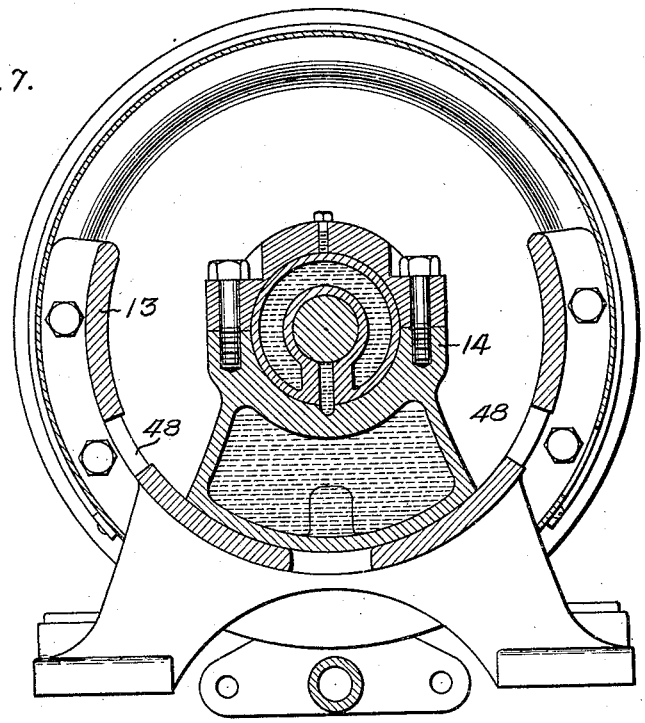
Figure 8:
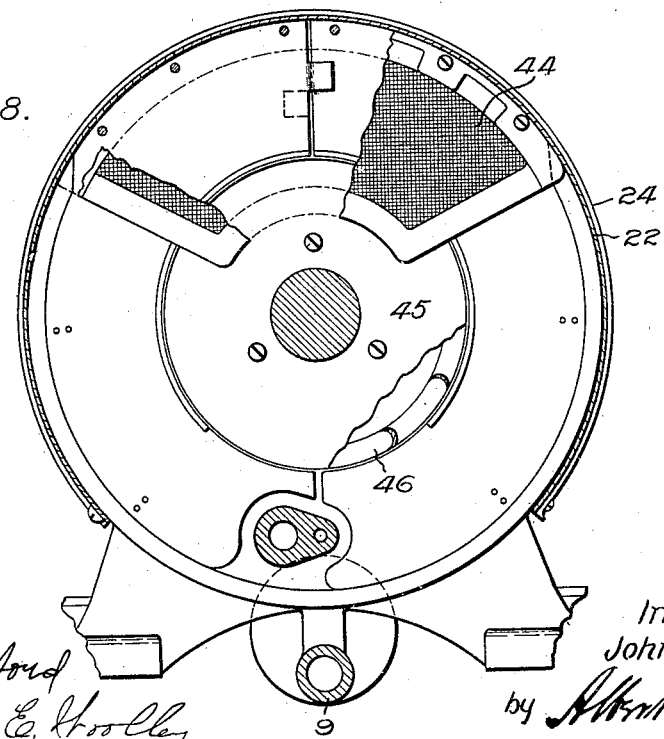
Figure 9:
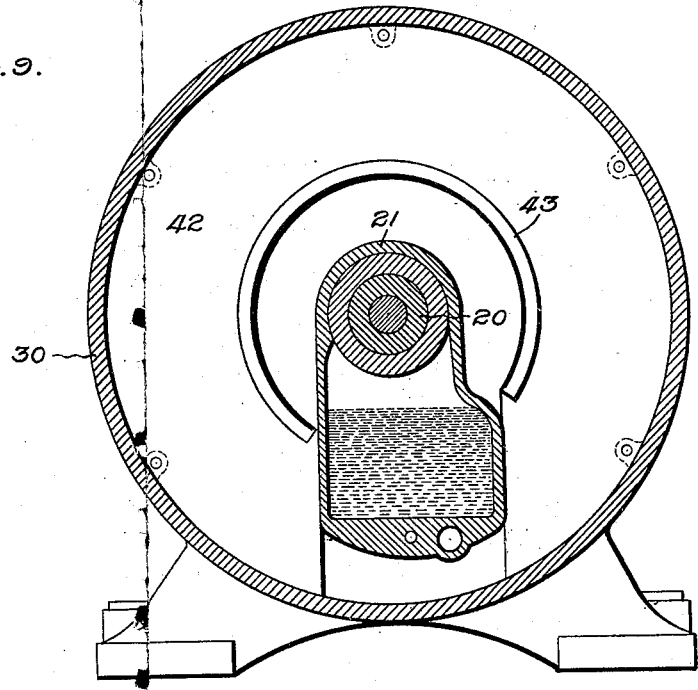
Figure 10:
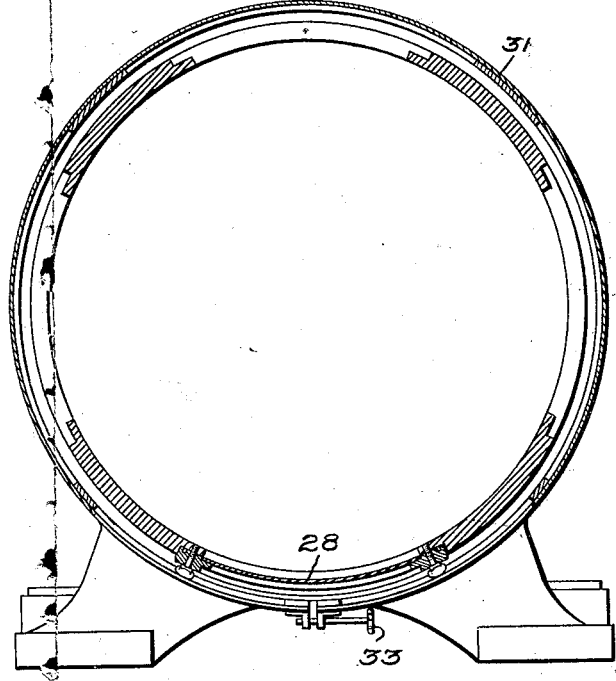

In the accompanying drawings, which illustrate one of the embodiments of my invention, Figure 1 is a view in side elevation of a turbo-generator with parts in section. Fig. 2 is a view in end elevation looking toward the turbine with certain of the parts broken away. Fig. 3 is an end view looking at the generator end of the machine, with certain parts broken away for the purpose of illustration. Figs. 4 and 5 are detail views showing the means for securing the covering to the machine-casing. Fig. 6 is an axial section through the generator. Fig. 7 is a cross-section taken on line 7 7 of Fig. 6 and looking in the direction of the arrows. Fig. 8 is a cross-section taken on line 8 8 of Fig. 6 and looking in the direction of the arrows. Fig. 9 is a sectional view through the air-baffling means at the generator end of the machine, the section being on line 9 9 of Fig. 6; and Fig. 10 is a transverse section of the frame of the generator, taken on line 10 10 of Fig. 6 looking in the direction of the arrows.

The present invention relates to turbo-generators, and more especially to those intended for out-of-door service. The present machine is designed to be used in connection with steam-locomotives and is intended to be located on top of the boiler, where it is exposed to rain, sleet, snow, dirt, &c. It is to be understood, however, that the invention is not limited to this class of work alone, since it is capable of wide application. Owing to the severe requirements of such service, it is necessary to inclose the working parts in such a manner that they are fully protected from the elements, while at the same time they must be readily accessible for the purpose of inspection or repair.

The turbo-generator is divided into sections.

A represents the governor-section; B, the turbine-section; C, the bearing-section; D, the generator-section; E, the commutator-section, and F the head-section. The machine is supported by feet 1, which are bolted to the supports 2, forming a part of the locomotive or other suitable base.

For the purpose of illustration the turbine is shown as being of the Curtis single-stage type; but the invention is not limited to the specific construction shown.

The turbine is provided with rows of wheel-buckets 3, and between adjacent rows of the wheel-buckets are stationary or intermediate buckets 4. Steam or other elastic fluid is supplied to the turbine by one or more conduits communicating with a sectionalized expanding nozzle 5, which is bolted to the wheel-casing. The admission of steam is controlled by the balanced throttle-valve 6, the latter being moved to and fro by a suitable speed-responsive device inclosed in the casing 7. Steam or other elastic fluid exhausting from the bucket-wheel enters the exhaust-conduit 8, which surrounds the main shaft and communicates at a point below the shaft with an exhaust-conduit 9, which may extend longitudinally or transversely of the machine. The casing for the bucket-wheel is provided with packings 10 and 11, the former serving to prevent the entrance of steam into the governor-casing 7 and the latter to prevent it from escaping into the bearing-section C. In addition to the packings radially-extending fan-blades 12 are mounted on opposite sides of the wheel-web, which create a pressure that tends to more or less balance the pressure of steam within the wheel-casing, and thus reduce leakage.

The generator is provided with a longitudinal neck 13, which extends about two-thirds around the shaft and is bolted to and supports the casing of the turbine. The bolt-holes in the neck and turbine-casing are placed equidistant, so that the turbine can be axially adjusted with respect to the generator, if desired. Mounted within the neck or projection is a shaft-bearing 14. (Best shown in Fig. 7.) The bearing is also made adjustable, so that the oil-reservoir contained in the base thereof will always stand in a horizontal position.

The generator in the present embodiment of the invention is of the bipolar direct-current type.

Referring to Fig. 6, 15 represents the armature or rotating portion, and 16 the stationary or field portion. In practice the field-poles occupy a horizontal position; but for the purpose of illustrating the general relation of the field-holes with respect to the armature-conductors one of them has been shown in a vertical position ninety degrees displaced from its normal position. The number of field-poles in the machine can be changed to satisfy the conditions of operation. The generator may be of the alternating or direct current type, as best suits the conditions of service.

17 represents the commutator, to which the armature-bars 18 are secured.

19 represents the supports for the brush-holders, the latter being omitted to simplify the drawing.

The right-hand end of the main shaft is provided with a spherical bearing-sleeve 20, that is mounted on a suitable bracket carried by the head 21 of the generator.

In order to prevent rain, snow, sleet, or dirt entering the bearing-section C, a sheet-metal cover 22 is provided which extends about two-thirds of the way around the shaft, suitable ventilating-openings being provided in the lower part between the cover 22 and the neck 13, which is of a smaller diameter. Retaining-bands 23 and 24 are employed to maintain the form of the cover and also to secure it in place. The band 24 is provided with an attaching-nut and bolt 25 for clamping it around the frame of the generator. In addition to this, removable clamping-screws 26 are provided. As a further means for ventilating the interior of the machine the casing may be provided with a screen 27; but care should be exercised to see that the top edge of the screen is somewhat below the upper surface of the neck 13, as otherwise water might work into it. The field-magnet frame of the generator being circular and unbroken, it is unnecessary to provide it with a detachable cover. The commutator-section E is, however, provided with one or more openings through which the brushes and brush-holders are accessible and which assist in cooling the generator by permitting a circulation of air. In the present illustration four of these openings around the commutator are provided and the lower one is closed by a suitable cover 28, that is held in place by bolts. The cover may comprise a sheet of metal or a fine-mesh screen, depending upon the conditions of service. When mounted on a locomotive, this cover may with advantage be made of sheet metal.

Surrounding the right-hand end of the generator-frame and also the head is a cylindrical cover 29, which assists in protecting the parts from dirt and moisture and is attached to the head 30, the latter being arranged to baffle the incoming currents of air, as will appear hereinafter. Surrounding the commutator-section of the generator is a light sheet-metal cover 31, resting upon the cylindrical cover 29. The cover 31 is secured in place by means of a band 32, Fig. 1, that is provided with a clamping-screw 33, Fig. 5. In Fig. 4 is shown a portion of the cover 31, on a somewhat enlarged scale, with slots 34 therein forming a part of a lantern or bayonet joint.

In a construction of this kind, if everything were tightly inclosed, it is evident that the temperature of the generator might at times rise to a point where it would result in injury to the insulation of the field and armature conductors, and thus decrease the life of the machine. It is also obvious that the entrance of any substantial amount of water or dirt into the generator would be accompanied by disastrous results. To obtain the benefits of good ventilation without the danger incident to the admission of foreign matter, I provide the head 30 of the machine, which is supported by suitable brackets 35, attached to the frame of the generator and the cylindrical cover 29. The head, as illustrated, comprises a ring which surrounds the shaft-bearing and its support and is provided on the right-hand side or forward part of the machine, when on a locomotive, with a baffle-plate 36. This plate is provided with an enlarged central opening 37 and a circular flange 38, the latter assisting to direct currents of air inward toward the opening 37. Situated directly back of the baffle-plate 36 is a disk 39, which makes a snug fit around the bearing and is provided with a number of segmental arc-shaped openings 40, Fig. 3. On the right face of the disk 39 is a ring having a lip 41, that acts to catch water or dirt entering through the opening 37 and causes it to run down to the bottom of the machine without entering the commutator-space. If, however, any foreign matter be carried beyond by the incoming currents of air, the tendency is for it to strike the inner cylindrical wall of the head and drop back instead of passing through the openings 40. If, however, any foreign matter be carried by the air through these openings, the baffle-plate 42, situated in front of the openings, tends to arrest it. The plate 42 is provided with a cylindrical opening around the shaft, which opening is provided with a gutter 43, that conveys any foreign matter downward and out of the path of the incoming air.

From the foregoing it will be seen that the plates 36 and 42, disk 39, and lip 41 act as a baffling means to prevent the entrance of foreign matter into the generator without, however, seriously interfering with the entrance of air. I have found the construction shown to be satisfactory in practice; but I do not wish to be understood as limiting my invention in all respects to the specific construction shown, since it can be modified without departing from the spirit of my invention.

After the air enters the chamber between the cover 29 and frame of the generator it passes through the openings in said frame, around the commutator, and over the conductors in the rotating and stationary members of the generator and thence out through a screen 44, Figs. 6 and 8, located between the field-magnet frame and the shaft-bearing at the turbine end. When the locomotive is in motion, a sufficient amount of air will pass through the generator and over the bearings near the turbine to keep the parts cool; but in the event of the locomotive remaining stationary for any length of time with the turbo-generator running under normal load conditions it is desirable to provide a means for positively creating a flow of air over the conductors. Such a means is provided in this case and comprises a fan 45, the moving member of which is mounted on the main shaft and is provided with revolving blades 46. Situated adjacent to the blades is a ring that is supported by a disk 47, the latter being so arranged that it prevents the air from passing out of the casing without first flowing through the fan or blower 45. The air flowing through the generator is discharged into the bearing-section C and in passing over the bearing contained therein and over the wall of the generator tends to reduce their temperatures. It also definitely prevents any flow of heated air from the turbine toward the generator, as will be noted later. The air is permitted to escape from openings 48, Figs. 2 and 7, formed in the neck through a passage 49, located between the neck and the surrounding cover 22 and through the space between the neck and cover. It will thus be seen that the outlet for the air is comparatively unrestricted, so that a large quantity of air can pass through the machine, and thus keep its temperature below the prescribed limit.

It will be seen that the air is drawn by the fan from the far end of the generator and is discharged at a point or points between the generator and the turbine. I regard this as an important feature of the invention, since it insures a continuous supply of cool air and also prevents or largely reduces the tendency of heated air or steam, due to leakage, to pass from the turbine into the generator-casing. The fan is shown in connection with a horizontal machine; but the invention is not to be construed as so limited, since it is also applicable to machines where the shaft occupies a vertical position.

The invention is particularly useful with large machines of the vertical-shaft type, which are located in central stations, because it prevents the heated air rising from the turbine from passing through the generator. In other words, the fan creates a current of air which opposes those air-currents rising from the turbines and also blows relatively cool air over the parts of the turbine adjacent to it.

In accordance with the provisions of the patent statutes I have described the principle of operation of my invention, together with the apparatus which I now consider to represent the best embodiment thereof; but I desire to have it understood that the apparatus shown is only illustrative and that the invention may be carried out by other means.

What I claim as new, and desire to secure by Letters Patent of the United States, is—

1. In combination, an elastic-fluid motor, a generator driven thereby, and a fan which receives air through the generator and discharges it at one or more points between it and the motor.

2. In combination, an elastic-fluid motor, a generator driven thereby, and a fan driven by the main shaft which causes a fluid medium to circulate through the generator to cool the conductors and discharges said medium in a direction to oppose any tendency for currents of heated air from the motor to enter the generator.

3. In combination, an elastic-fluid motor, a generator driven thereby, and a means constructed and arranged to cause a current of air to enter the generator at a point remote from the motor and to flow through the generator and be discharged at one or more points between the motor and generator.

4. In combination, an elastic-fluid motor, a generator driven thereby, a shaft which is common to the motor and generator, a fan mounted on the shaft at the end of the generator adjacent to the motor, which draws air over the conductors in the generator, and means for causing the fan to discharge the air at one or more points between the motor and generator.

5. In combination, a dynamo-electric machine, a casing for the machine which is provided with receiving and discharge openings to permit of a circulation of air, and a baffling means suitably located with respect to the receiving-opening to prevent the entrance of foreign matter, said means including a plurality of plates which deflect the entering current of air transversely to the axis of the generator.

6. In combination, a generator, a motor for driving it, a casing for the generator, an opening admitting air to the casing, a baffler for preventing the entrance of foreign matter to the casing, a discharge-opening for the casing, and a protecting device which prevents the entrance of foreign matter through the discharge-opening.

7. In combination, a generator, a motor for driving it, a casing for the generator having inlet and discharge openings, a baffling means for the inlet to prevent the entrance of foreign matter, and a fan which receives air from the baffled inlet and causes it to pass out through the discharge-opening.

8. In combination, a motor, a generator driven thereby, a frame for the generator having openings therein, an inclosing casing for the frame which contains a chamber communicating with the interior of the generator-frame, a baffling device regulating the admission of air to said chamber, a fan which causes a current of air to pass over the conductors when the machine is in operation, and an opening arranged to discharge the air delivered by the fan.

9. In combination, a motor, a generator driven thereby, a neck which connects the motor and generator, a covering which incloses the neck, an opening between the neck and covering to permit the escape of air, and an opening for admitting air to the generator-casing.

10. In combination, a motor, a generator driven thereby, a neck which connects the motor and generator, a covering which incloses the neck and is separated therefrom by a space through which air is discharged, a fan for causing a current of air to pass through the generator-casing and be discharged through said space, and a screen intermediate the fan and said space.

11. In combination, a motor, a generator driven thereby, a baffler which prevents the admission of foreign matter to the generator and comprises a number of perforated plates, a means for directing the air-currents into the perforations, and an opening which discharges the air from the generator-casing.

12. A dynamo-electric machine comprising a frame having ventilating-openings for supplying air to the interior of the machine, an inclosing casing or cover for the frame which contains a chamber communicating with the openings which supply the interior of the machine, and a head attached to the casing adjacent one end of the machine, the head having an air-inlet, also communicating with the chamber, which permits a flow of air through the head and the chamber to ventilate the machine, but prevents the entrance of foreign matter with the air.

In witness whereof I have hereunto set my hand this 6th day of June, 1906.

JOHN G. CALLAN.

Witnesses:
JOHN A. McMANUS, Jr.,
HENRY O. WESTENDARP.